(12) United States Patent
Arisawa

(10) Patent No.: US 8,072,177 B2
(45) Date of Patent: Dec. 6, 2011

(54) STEPPING MOTOR DRIVER

(75) Inventor: Daijiro Arisawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 584 days.

(21) Appl. No.: 12/206,096

(22) Filed: Sep. 8, 2008

(65) Prior Publication Data

US 2009/0066278 A1 Mar. 12, 2009

(30) Foreign Application Priority Data

Sep. 10, 2007 (JP) ................................ 2007-233542

(51) Int. Cl.
*H02P 8/12* (2006.01)
(52) U.S. Cl. ........................................ 318/685; 318/611
(58) Field of Classification Search .................. 318/685, 318/696, 700, 701, 611, 623, 629, 448, 702
See application file for complete search history.

(56) References Cited

U.S. PATENT DOCUMENTS

| | | | |
|---|---|---|---|
| 5,708,578 A * | 1/1998 | Stoddard et al. ................ 363/98 |
| 5,886,484 A * | 3/1999 | Fucili et al. .............. 318/400.29 |
| 6,066,930 A | 5/2000 | Horiguchi et al. ............. 318/439 |
| 6,196,650 B1 * | 3/2001 | Inagaki ..................... 318/400.32 |
| 6,208,112 B1 * | 3/2001 | Jensen et al. .................. 318/805 |
| 6,218,795 B1 * | 4/2001 | Syukuri .................. 318/400.17 |
| 6,919,763 B2 * | 7/2005 | Boscolo et al. ............... 330/146 |
| 6,956,351 B2 | 10/2005 | Yamada ......................... 318/685 |
| 2003/0076068 A1 | 4/2003 | Pollock et al. ................ 318/685 |
| 2007/0159122 A1 * | 7/2007 | Nolan et al. .................. 318/245 |

FOREIGN PATENT DOCUMENTS

| JP | 2003-186792 | 7/2003 |
|---|---|---|
| JP | 2005-27370 | 1/2005 |

* cited by examiner

*Primary Examiner* — Bentsu Ro
(74) *Attorney, Agent, or Firm* — Steptoe & Johnson LLP

(57) ABSTRACT

In a drive of a stepping motor, an electromotive force is generated on the coil of a motor with a sinusoidal wave having the same period as an energization period by smoothly rotating a rotor with microstep driving, and an induced power is stably detected by detecting the electromotive force at the zero cross of driving current. The detection around the current zero cross makes it possible to shorten a detection section, form a driving waveform with few distortions, and perform driving with a driving waveform as in an ordinary micro step. Thus a circuit is provided which is aimed at reducing noise, vibrations, and loss of synchronization, and increasing current consumption efficiency in the determination of stop.

4 Claims, 14 Drawing Sheets

STEPPING MOTOR DRIVER

FIELD OF THE INVENTION

The present invention relates to a stepping motor driver, and particularly relates to a stepping motor driver which determines whether an optical pickup is stopped or not in an optical disk device.

BACKGROUND OF THE INVENTION

Conventionally, before reading or writing data in an optical disk device, it is necessary to read disk information on the innermost end of a disk after power is turned on. However, an optical pickup is not always placed on a predetermined point because of disturbance. Thus the optical pickup is moved to one of the outermost end and the innermost end of the disk to adjust the offset of the position of the optical pickup, and then a reading sequence is started. In this movement to one of the outermost end and the innermost end, an optical sensor and a contact switch have been used to detect arrival at a destination. However, these components are more expensive than motor driver ICs. In order to reduce the cost of the overall optical disk device, a stop determination function is provided for the motor driver IC of a stepping motor and components required as detectors have been reduced. It is detected that an induced voltage is not outputted when the optical pickup reaches the innermost end and the outermost end, the optical pickup is made unmovable by a stop member, and the rotor of the stepping motor is locked. Further, the occurrence of an induced voltage in a normal rotation is detected. In the prior art, however, the detection of an induced voltage requires a high impedance section in an energization pattern and affects an energization waveform, causing a loss of synchronization of the rotor, vibrations, noise, and higher power consumption.

A technique relating to the present invention is, for example, described as a patent document in JP2005-27370A2. In order to detect the state of a rotor, a detection state setting unit is provided for setting a detection state in which one motor coil of two phases is cut off when the other coil can be energized, an induced voltage detecting unit is provided for detecting the induced voltage of the one coil, and a rotor state determination unit for determining the state of the rotor based on the detected induced voltage. With this configuration, the state of the rotor is determined based on the state of the induced voltage which is generated during the movement of the rotor.

DISCLOSURE OF THE INVENTION

The present invention provides, in an optical disk device, a circuit for detecting the non-rotational state of a rotor based on a change of an induced voltage generated on a coil for driving a stepping motor, in the case where the stepping motor rotates which serves as a power source of a mechanism for moving an optical pickup by the rotation of a feed screw, the optical pickup is moved to one of the innermost end and the outermost end of a disk, reaches the end of a movable range, and is made unmovable by a member interrupting the movement of the optical pickup on the end of the movable range, and the rotor of the linked stepping motor enters the non-rotational state.

Further, in order to detect a change of current and voltage of induced power on a coil to be detected in the prior art, sufficient time is necessary for the discharge of applied current and a sequence of repeating detection several times, and an exciting method is limited to full-step driving, half-step driving, and so on. Although a microstep method is available, detection requires a high-impedance output for a relatively long period. A high-impedance section deforms a load current waveform and forms a driving waveform for each phase, so that noise and vibrations may occur on a stepping motor and a rotor is likely to lose synchronization. Moreover, such a method causes large power consumption and low efficiency, so that driving with an ideal microstep waveform is impossible in the determination of stop.

In the present invention, an electromotive force is generated on the coil of a motor with a sinusoidal wave having the same period as an energization period by smoothly rotating a rotor with microstep driving, and an induced power is stably detected by detecting the electromotive force at the zero cross of driving current. The present invention provides a circuit which is aimed at reducing a detection section through detection around the zero cross of current, forming a driving waveform with few distortions, and performing driving with a driving waveform as in an ordinary microstep method. Further, the circuit is aimed at reducing noise, vibrations, and loss of synchronization, and increasing current consumption efficiency in the determination of stop.

In order to attain the object, an induced voltage is detected around the zero cross of a coil current at the switching of the direction of the coil current, and the timing is generated from an input command level corresponding to the zero cross of the coil current.

The present invention can suppress the distortions of an energization waveform of a stepping motor and enable the stop determination of a rotor. By reducing distortions, it is possible to reduce vibrations, noise, loss of synchronization, and power consumption which adversely affect stop determination in the prior art.

DESCRIPTION OF THE EMBODIMENTS

Figure 1:
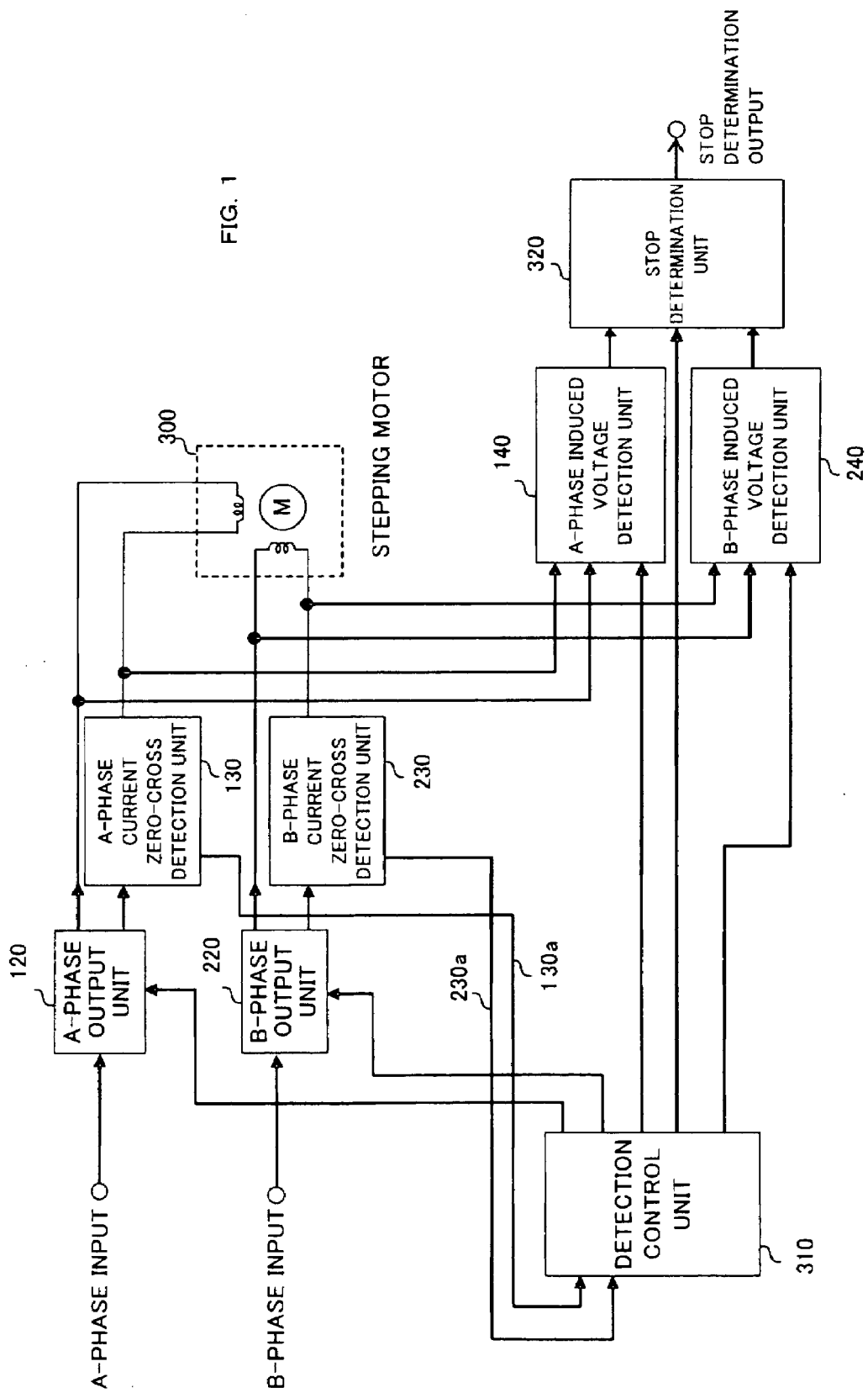
FIG. 1 is an explanatory drawing showing a first embodiment of the present invention.

FIG. 1 is an explanatory drawing showing the first embodiment of the present invention. In FIG. 1, reference numeral 300 denotes a two-phase bipolar stepping motor. An A-phase input signal and a B-phase input signal are fed with an analog signal having one of a sinusoidal wave and a triangular wave with a phase shift of 90° and digital information. In an A-phase output unit (120) and a B-phase output unit (220), the power transistors of one of the output units are driven so as to output a voltage or current obtained by multiplying the values of the A-phase input signal and the B-phase input signal by an optionally set gain.

Figure 2:
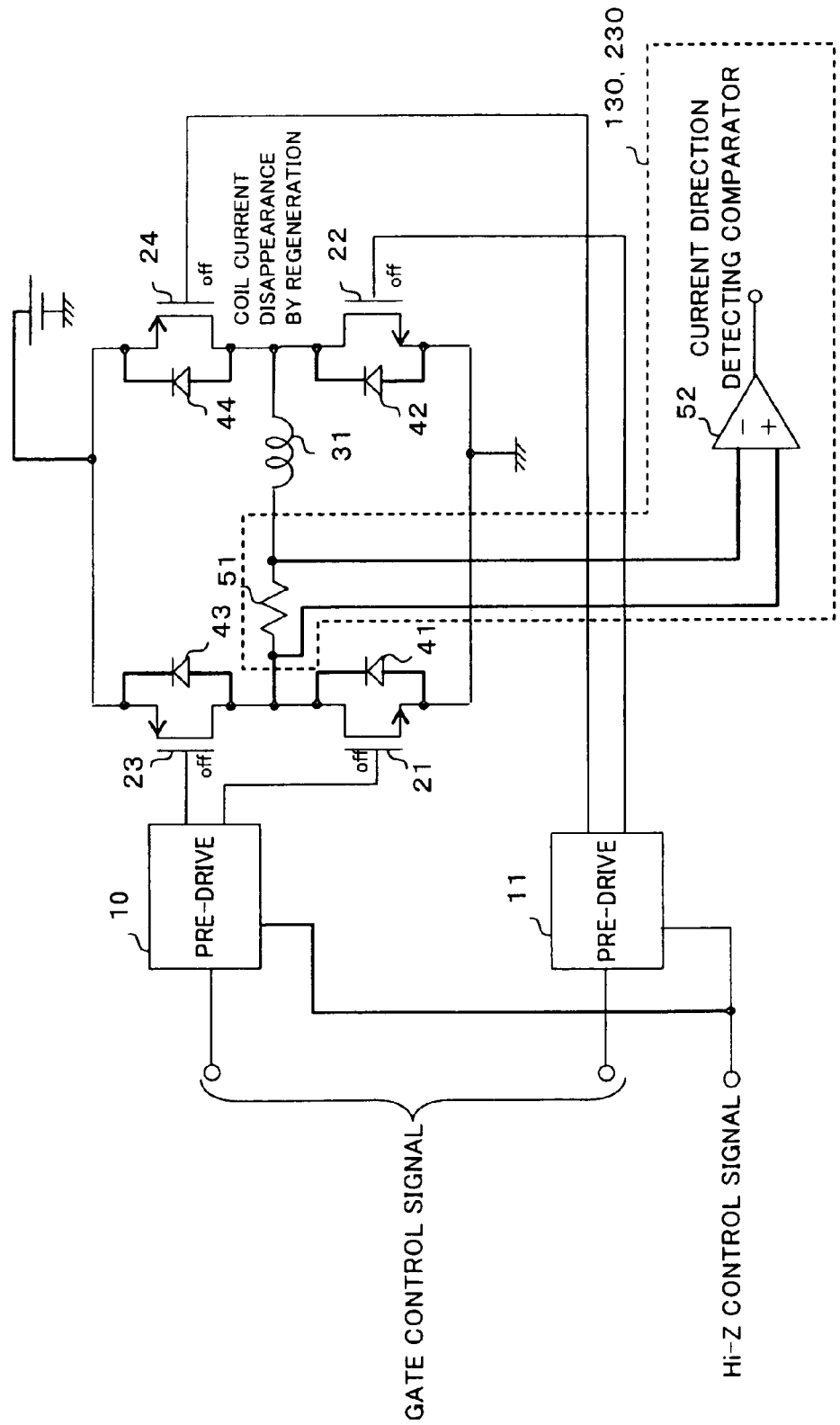
FIG. 2 is an explanatory drawing showing 120 and 130 of FIG. 1.

FIG. 2 shows an example of the configuration of the driven power transistor. FIG. 2 shows an H-bridge configuration for PWM driving. Diodes (41, 42, 43, 44) for regeneration are provided on a power supply and the ground from an output terminal connected to a motor coil (31). Power transistors (21, 22, 23, 24) are driven through pre-drives (10, 11). The power transistors have the function of obtaining a high impedance in response to a signal from a detection control unit (310) regardless of the state of an input signal. When an output has a high impedance, a current in the motor coil (31) rapidly increases a voltage across the coil because of the inductance of the coil, the current is regenerated on the power supply and the ground by the diodes (41, 42, 43, 44), and the current in the motor coil (31) disappears.

An A-phase current zero-cross detection unit (130) and a B-phase current zero-cross detection unit (230) which detect a current zero cross are respectively inserted between the output of the A-phase output unit (120) and the coil of a motor and between the output of the B-phase output unit (220) and the coil (31) of a motor. The A-phase current zero-cross detection unit (130) and the B-phase current zero-cross detection unit (230) output detection results of zero cross to the detection control unit (310). The detection control unit (310) performs a sequence of detecting an induced voltage. One of the A-phase and B-phase output units is made up of an H bridge including the power transistors (21, 22, 23, 24) and the diodes for regeneration (41, 42, 43, 44) and the pre-drives for directly driving the power transistors. One of the A-phase and B-phase current zero-cross detection units is made up of a resistor (51) inserted between the output terminals of the H bridge in series with the coil (31) of the motor, and a current direction detecting comparator (52). Both ends of the resistor are connected to the inverting input and the non-inverting input of the comparator, an edge at which the output of the comparator is switched is the timing of the current zero cross of the coil (31), and a signal indicating a direction switched at an edge of a square wave can be outputted.

Figure 3:
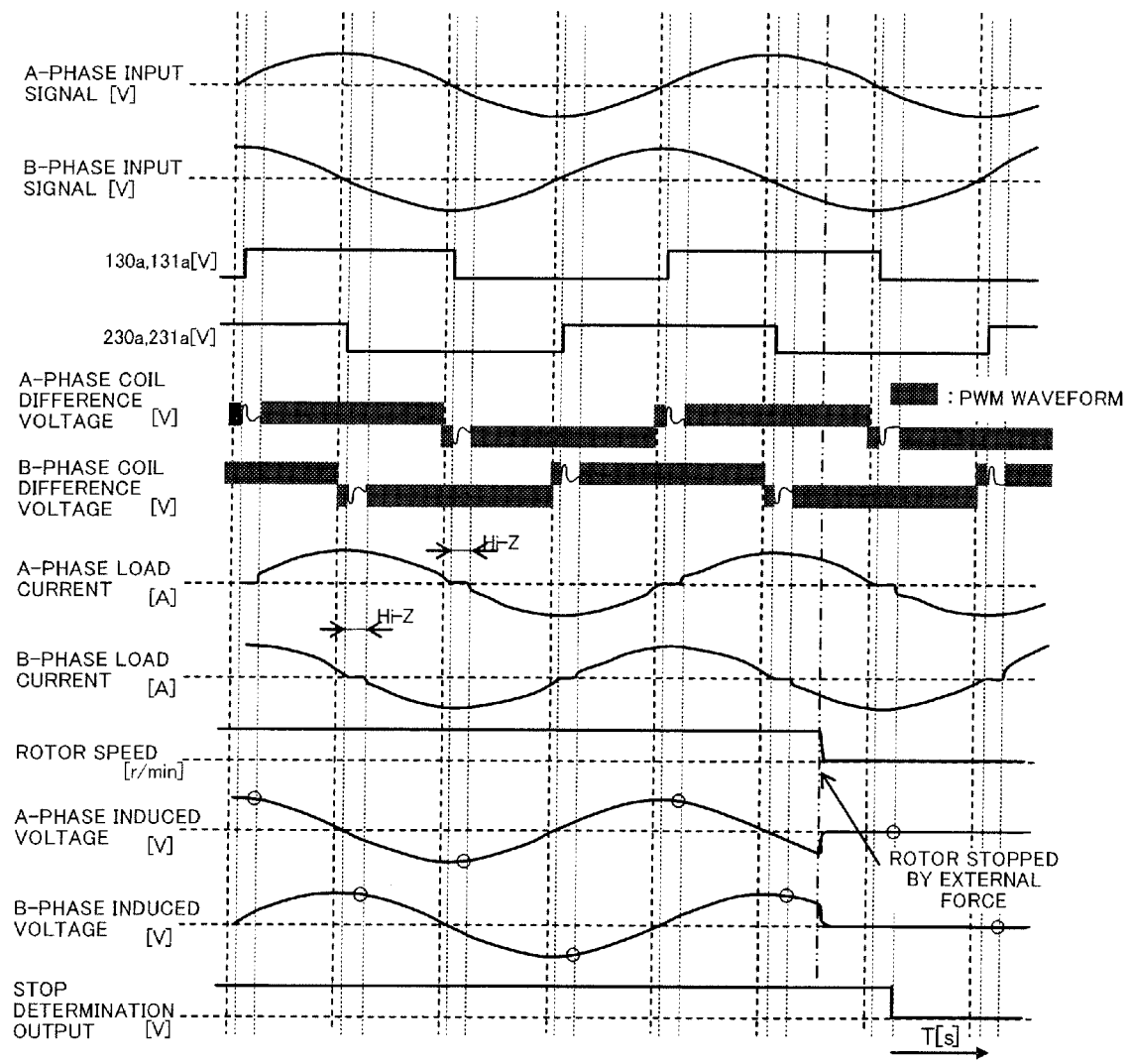
FIG. 3 is an input/output waveform chart of FIG. 1.

FIG. 3 shows an input signal, a detection control signal, a coil difference voltage, a load current, and an induced voltage of each phase and further shows the rotation speed of a rotor and the logic of stop determination output according to the embodiment. In FIG. 3, when a signal indicating the timing of detection is inputted at a rising edge and a falling edge to one of an output signal (131a) of the A-phase current zero-cross detection unit and the output signal (231a) of the B-phase current zero-cross detection unit, the detection control unit (310) transmits a command for obtaining a high impedance output for a certain time to the output unit (120, 220) of the phase to be detected. When one phase has a high impedance, the current of the coil is regenerated as has been discussed, so that the current becomes zero. Even when one phase has a zero current, the current value of the other phase keeps changing and the rotor keeps rotating by the inertia of the rotor in microstep driving. A distance between the permanent magnet of the rotor and the coil changes and an induced voltage is generated. The induced voltage generates a voltage having a sinusoidal wave with the same period as an energization period in synchronization with the phase of the rotor. When the rotor is completely stopped, a distance between the permanent magnet of the rotor and the coil does not change. Thus the induced voltage is not generated. When the rotor is brought into contact with a stop member with an impact, the rotor moves back in an actual operation. Thus an induced voltage is generated in a different direction from the direction of an actual induced voltage. One of an A-phase induced voltage detection unit (140) and a B-phase induced voltage detection unit (240) detects the generation of an induced voltage. The detection control unit (310) instructs the induced voltage detection unit (140, 240) of the phase to be detected, about the timing of detection and a direction along which the induced voltage is generated. The induced voltage detection unit (140, 240) detects the direction along which the induced voltage is generated and detects whether or not the absolute value of the induced voltage exceeds a predetermined threshold value, and outputs the result to a stop determination unit (320). The stop determination unit (320) updates a stop determination result in each energization period of 90°. The result of one of the induced voltage detection units (140, 240) is updated every time the detection control signal is generated, so that a determination result can be obtained with high responsiveness. As the coil has a larger number of phases, the stop determination result is updated at shorter intervals. Moreover, a circuit size can be reduced by reducing the number of detected phases and increasing an interval between updates.

As another embodiment the present invention, a determination about whether the rotor is stopped or rotated is outputted based on a plurality of results from an induced voltage detection unit. For example, when it is determined that the rotor is stopped, the state is recorded. When it is determined again that the rotor is stopped at the subsequent determination update in which a rotation is kept, a stop signal is not outputted to a stop determination output until it is determined that the rotor is stopped for two consecutive times. The stop signal can be outputted also after more determinations or when at least a predetermined number of stops are determined in a period. The plurality of results from the induced voltage detection unit make it possible to achieve stop determination with higher reliability.

As shown in FIG. 3, as a detection position, an output current at the zero cross has the largest induced voltage and is the most effective against noise and an induced voltage resonance reduced by resonance. The amplitude of the generated induced voltage is substantially proportionate to the number of revolutions. The larger number of revolutions, the higher induced voltage. The threshold value is set in consideration of the number of revolutions and an allowance for a phase shift.

Further, since a high impedance output can be obtained when the output current is zero, the distortions of waveforms can be minimized and efficient driving can be performed. When a high impedance output is obtained while the output current remains, detection has to be performed with the high impedance until the current is completely regenerated. Thus as the output current increases, a longer time is necessary for the high impedance. Switching to the high impedance at the current zero cross can shorten a high impedance time, reduce a non-conducting time, and suppress the distortions of an output waveform.

Figure 4:
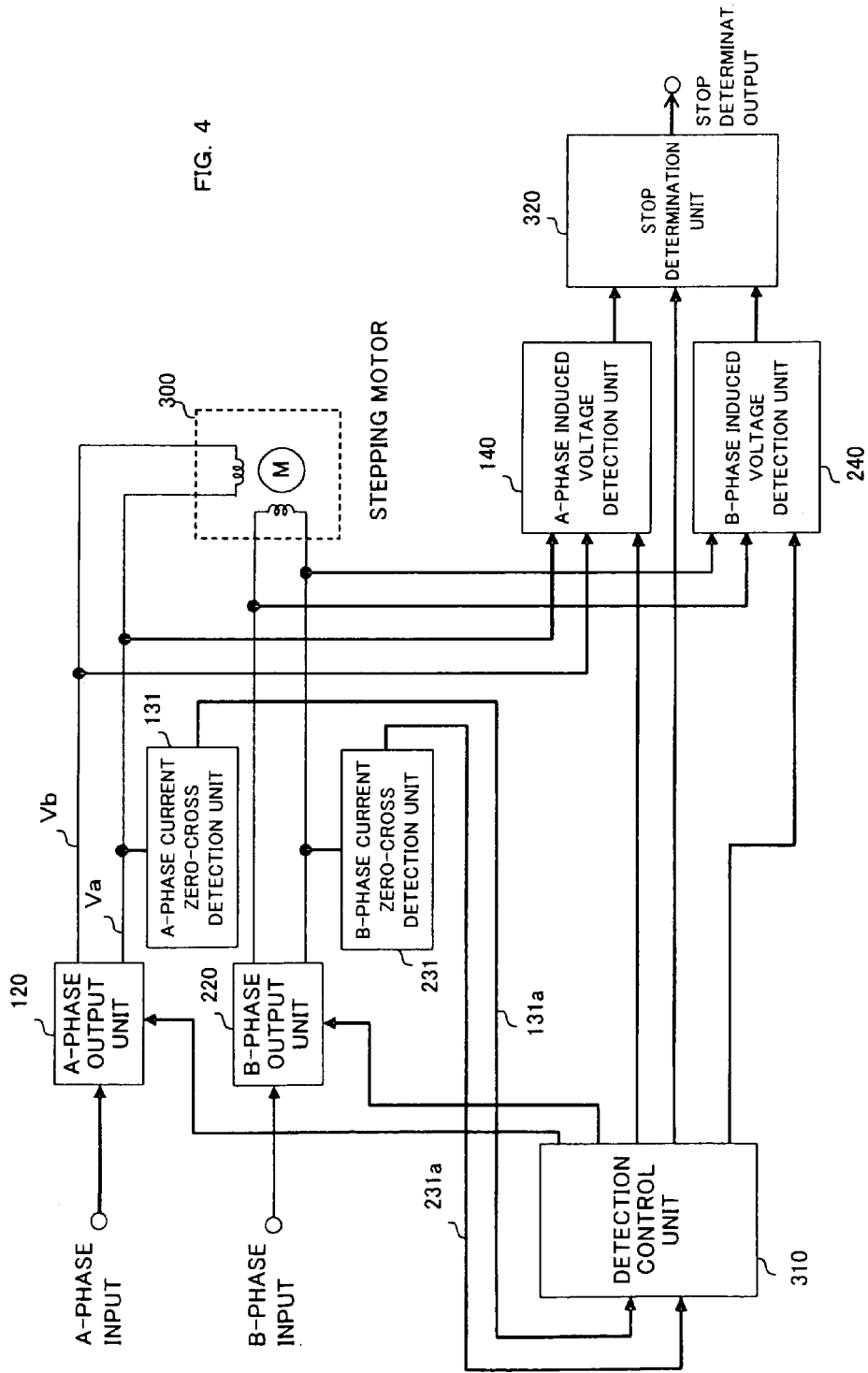
FIG. 4 is an explanatory drawing showing a second embodiment of the present invention.
Figure 5:
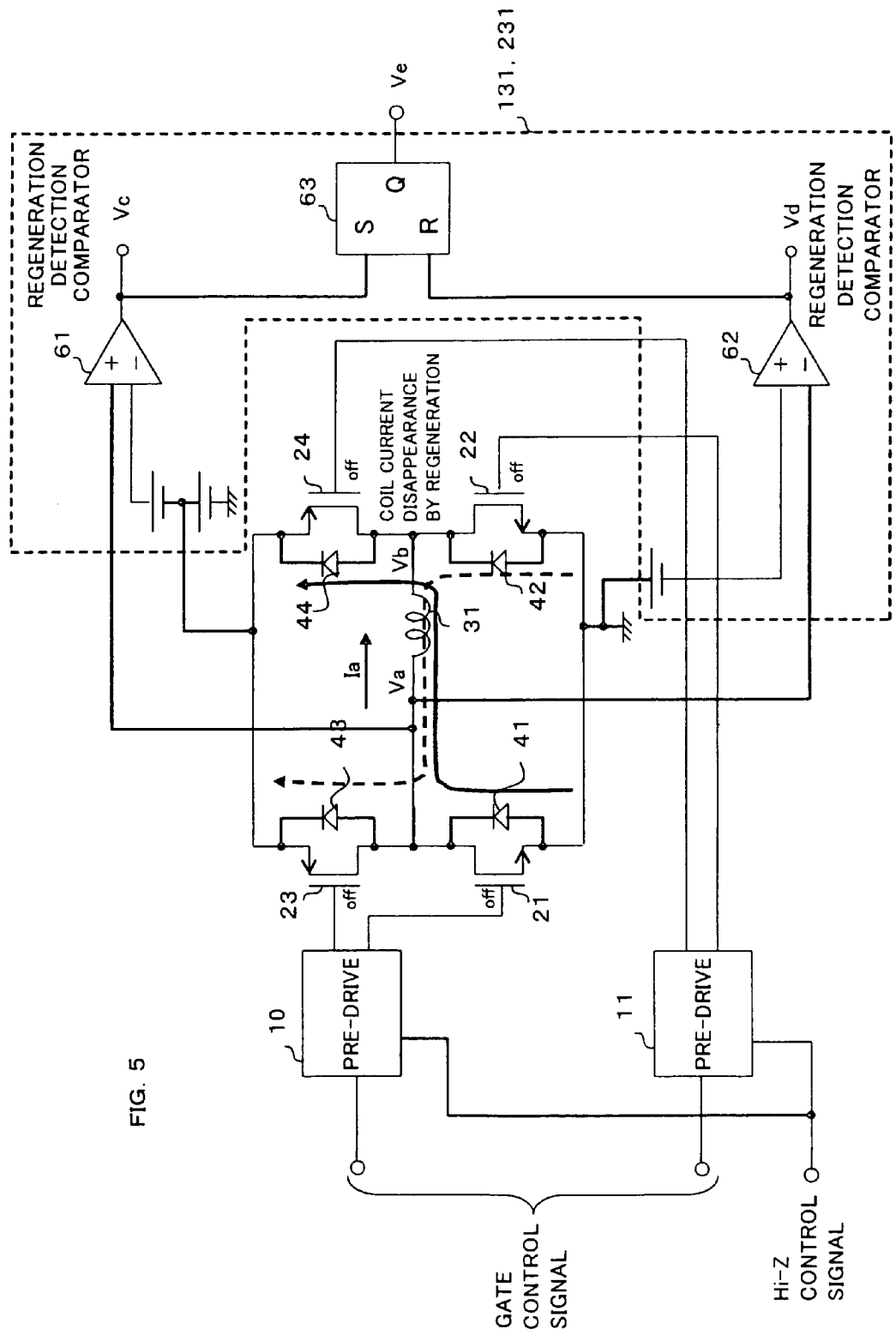
FIG. 5 is an explanatory drawing showing 120 and 130 of FIG. 4.
Figure 6:
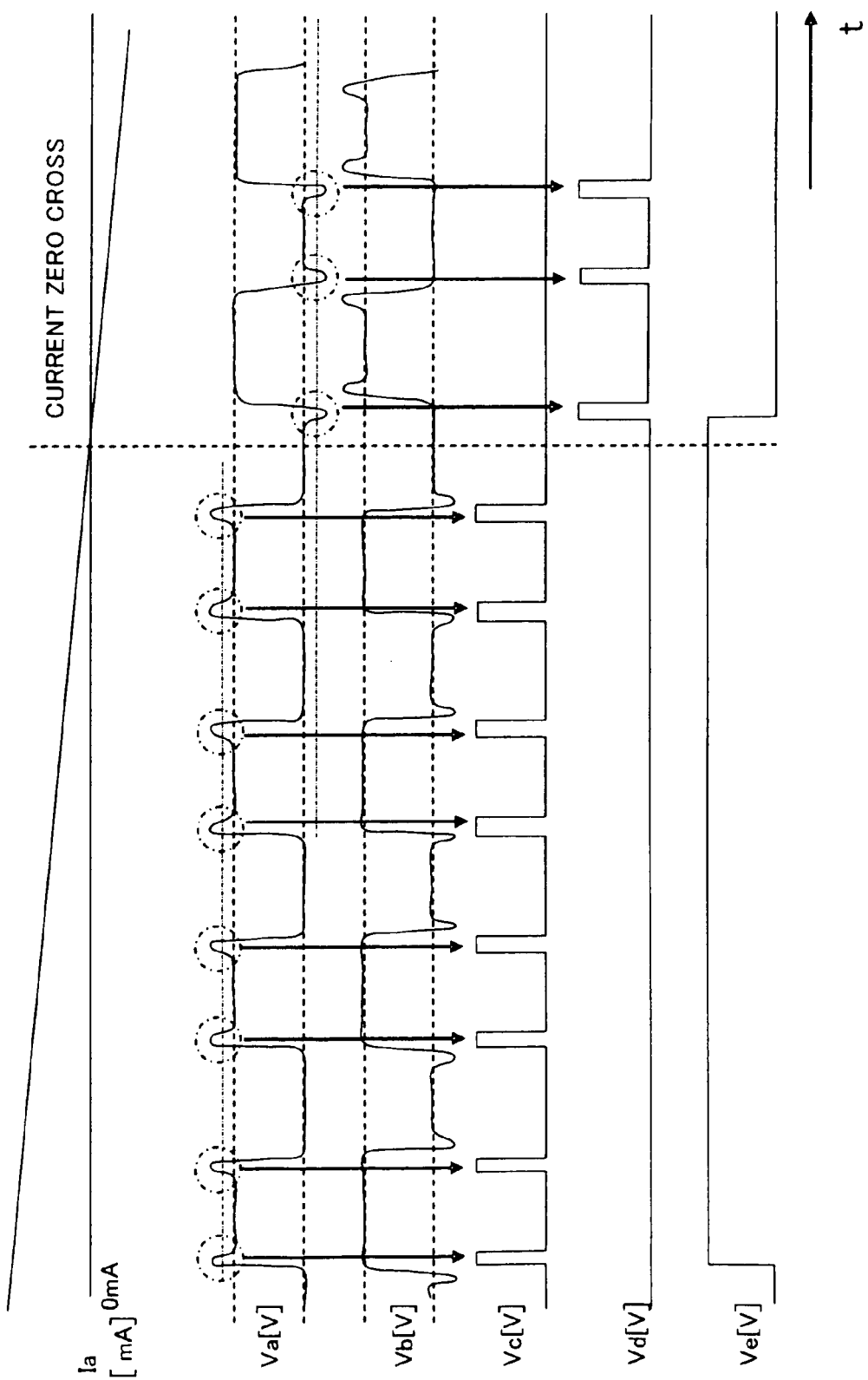
FIG. 6 is an input/output waveform chart of FIG. 5.

FIG. 4 is an explanatory drawing showing the second embodiment of the present invention. An A-phase current zero-cross detection unit (131) and a B-phase current zero-cross detection unit (231) which detect a current zero cross according to a clipped voltage during regeneration are connected to one output of an A-phase motor coil and one output of a B-phase motor coil, respectively. The A-phase current zero-cross detection unit (131) and the B-phase current zero-cross detection unit (231) output detection results of zero cross to a detection control unit (310). The detection control unit performs, as in the embodiment of FIG. 1, a sequence for detecting an induced voltage. FIG. 5 is an explanatory drawing of the A-phase current zero-cross detection unit (131) and the B-phase current zero-cross detection unit (231). When PWM driving of both chopping method is performed in an H-bridge circuit shown in FIG. 5, outputs Va and Vb connected to both ends of a coil (31) alternately repeat L output and H output. When a difference in voltage between Va and Vb appears, the coil is energized. Usually, an output current is smoothed by performing PMW driving with a sufficiently shorter period than a time constant determined by the inductance and the resistance value of the coil of a motor. The smoothed current has a phase delayed from the phase of the mean value of an output voltage by the time constant determined by the inductance and the resistance value of the coil. When the outputs Va and Vb change from L output to H output and from H output to L output, PWM driving requires a dead-time period during which a power transistor on a power supply and a power transistor on the ground are simultaneously turned on and then both of the transistors are turned off so as not to generate a flow-through current. When the output is in the dead-time period, a current is regenerated through a diode. When the current is regenerated on the power supply, the output has the potential of a power supply voltage plus the forward voltage of the diode. When the current is regenerated on the ground, the potential is lower than a ground potential by the forward voltage of the diode. FIG. 6 shows the output waveform of the power transistor around the current zero cross, the output waveforms of comparators, and the output signal of current zero-cross stop determination. The current zero-cross detection unit monitors Va and Vb and a clamping voltage generated by regeneration is detected by comparators (61, 62). The comparators (61, 62) for detecting regeneration output output results Vc and Vd to an R-S flip-flop (63). By changing the direction of current, a detection output is switched from the comparator (61) on the power supply to the comparator (62) on the ground. An output Ve of the R-S flip-flop (63) indicates the direction of current, and rising and falling edges indicate the timing of switching directions. The current zero-cross detection unit outputs the timing of zero cross to the detection control unit, and the detection control unit (310) performs the sequence for detecting an induced voltage as in the embodiment of FIG. 1.

Figure 7:
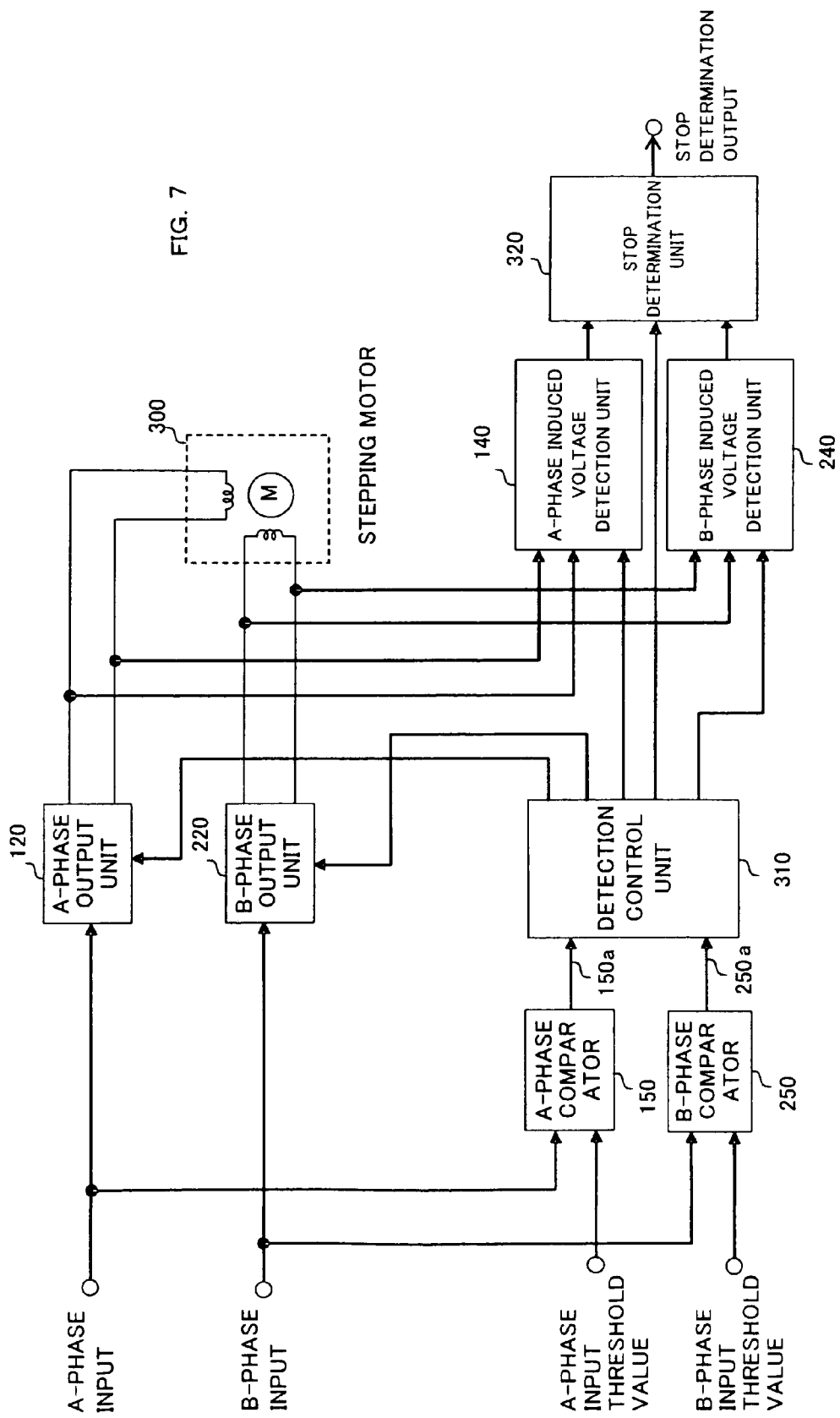
FIG. 7 is an explanatory drawing showing a third embodiment of the present invention.

FIG. 7 is an explanatory drawing showing the third embodiment of the present invention. As in the embodiment of FIG. 1, reference numeral 300 denotes a two-phase bipolar stepping motor. To an A-phase input signal and a B-phase input signal, an analog signal having one of a sinusoidal wave and a triangular wave with a phase shift of 90° and digital information are inputted. An A-phase output unit (120) and a B-phase output unit (220) drive power transistors so as to output a current obtained by multiplying the values of the A-phase input signal and the B-phase input signal by a optionally set gain.

Figure 8:
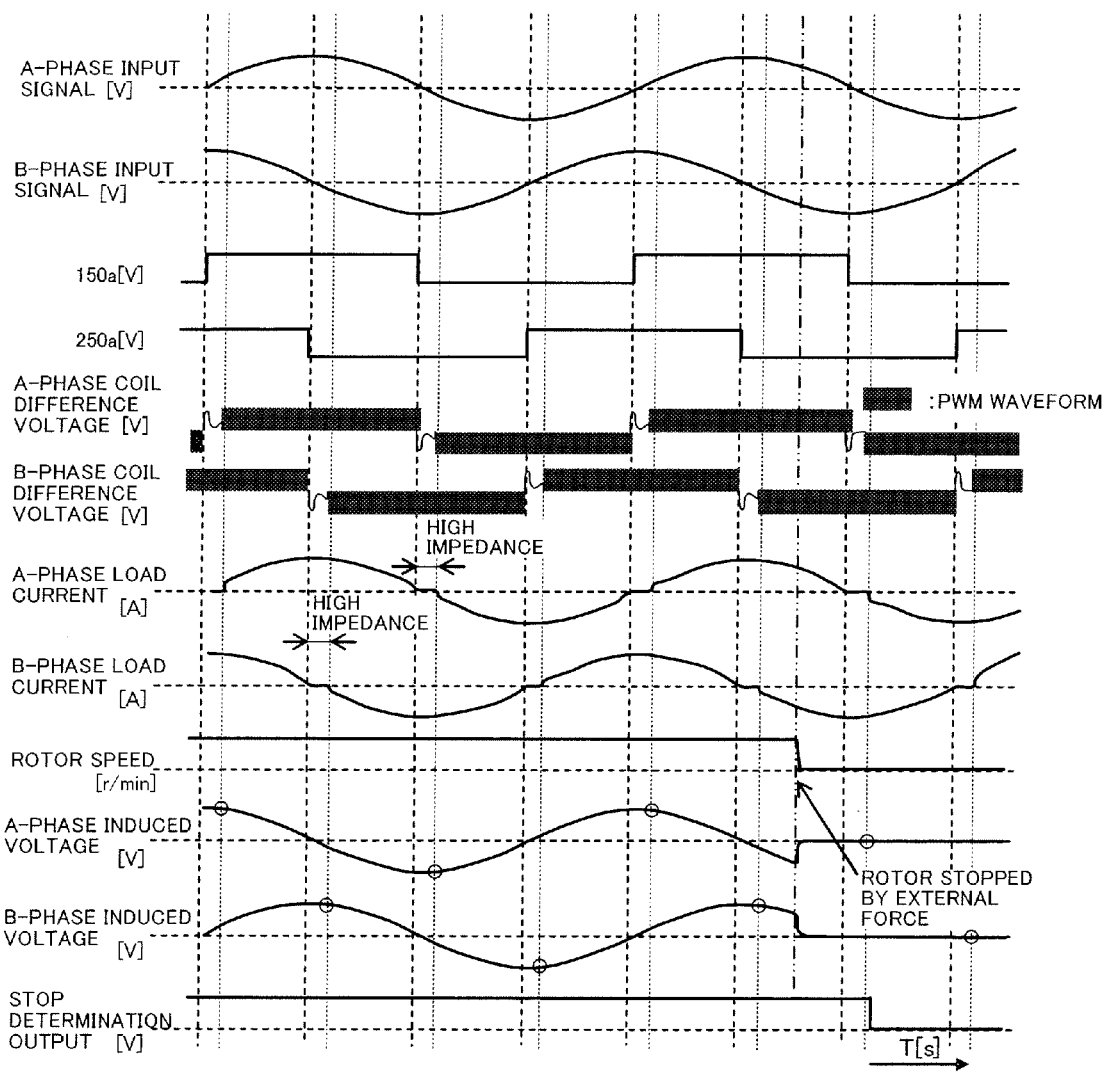
FIG. 8 is an input/output waveform chart of FIG. 7.

FIG. 8 shows, according to the third embodiment of the present invention, an input signal of each phase, an input threshold value of each phase, the output signal of the comparator of each phase, a voltage difference between coil terminals, a load current, an induced voltage, the rotation speed of a rotor, and the logic of stop determination output. The A-phase input signal and an A-phase input threshold value are compared with each other by an A-phase comparator (150) and are outputted as a binary output signal (150a). A B-phase input threshold value is compared by a B-phase comparator (250) and is outputted as a binary output signal (250a). The two output signals (150a, 250a) are inputted to a detection control unit (310). At the rising and falling edges of the two output signals (150a, 250a), a signal is transmitted to have a high-impedance output for a certain time from the output unit (120, 220) of a phase to be detected. A previous input command comes close to zero at this moment and the current of a coil comes close to zero, though a small amount of the current remains. Thus when a phase has a high impedance, the current of the coil is regenerated and completely becomes zero in a short time.

Figure 9A:
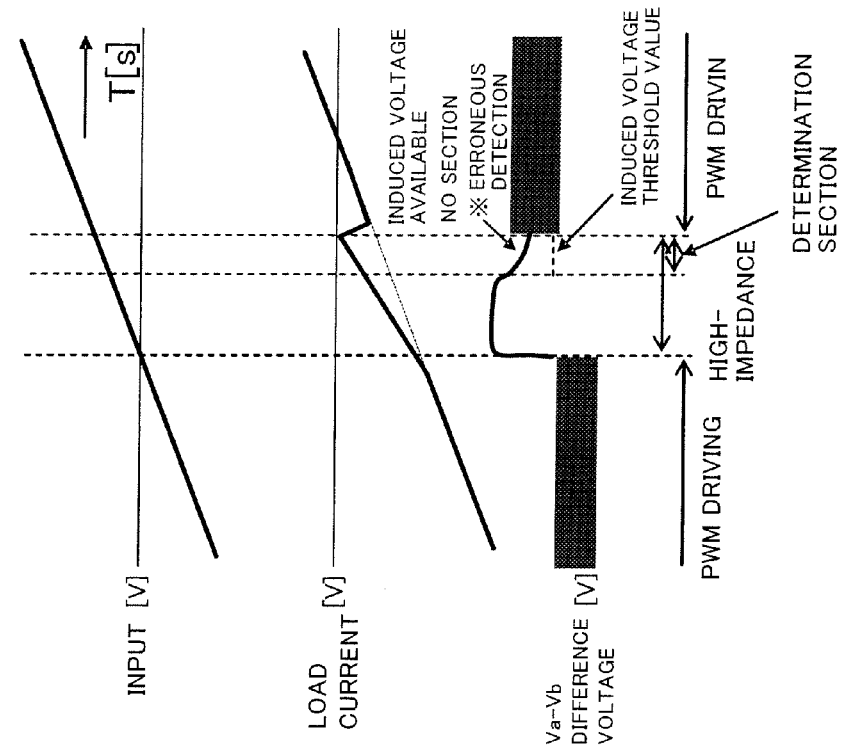
FIG. 9A and FIG. 9B are a waveform chart around the dead zone of an output current feedback method and a waveform chart around the dead zone of voltage driving.

FIG. 9A shows, around an input zero cross, the waveforms of the input signal, a load current, and a difference in voltage between an output Va terminal and an output Vb terminal when a high-impedance output is obtained at the input zero cross according to a current driving method. When the driving method uses output current feedback, an input command and an output current are in phase with each other. Thus the timing of the input zero cross and the timing of the zero cross of output current are synchronized with each other. By setting the A-phase input threshold value and the B-phase input threshold value at the zero position of an input waveform, a rectification time by regeneration can be minimized. Thus a high impedance required for detection can be also shortened, so that the detection can be performed in a short time. Moreover, the highest induced voltage can be detected and thus a rotating state and a non-rotating state can be easily distinguished from each other. Thus the zero cross of output current is not directly detected. When an input value is zero, the timing of the zero cross of output current is obtained based on the input value obtained through feedback. Consequently, the detection can be performed in a short time and the same effects as the configurations of FIGS. 1 and 4 can be obtained.

Figure 9B:
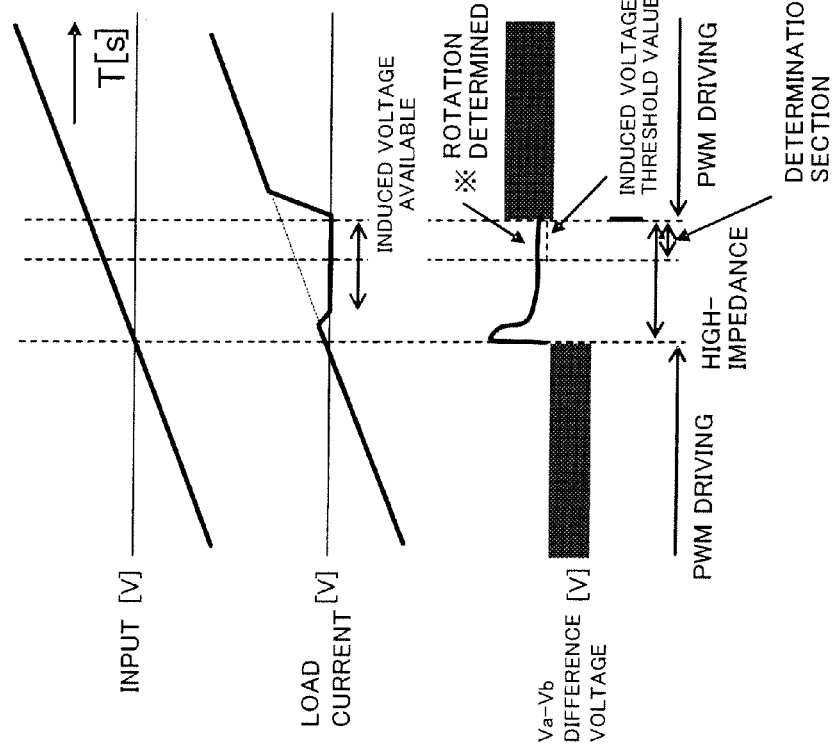

FIG. 9B shows, around the input zero cross, the waveforms of the input signal, a load current, and a difference in voltage between the output Va terminal and the output Vb terminal when a high-impedance output is obtained at the input zero cross in voltage driving. At the input zero cross of voltage driving, the phase of current is delayed by the inductance of a coil (31) and the time constant of a resistance component. When a high-impedance output is obtained at the timing of the input zero cross, an amount of current passing through the coil (31) is not sufficiently small and a time period until a load current becomes zero by regeneration has to be sufficiently long as compared with current feedback. Insufficient high-impedance time cannot enable accurate measurements but a long high-impedance section distorts an energization waveform, so that it is impossible to reduce vibrations and noise and prevent loss of synchronization.

Figure 10:
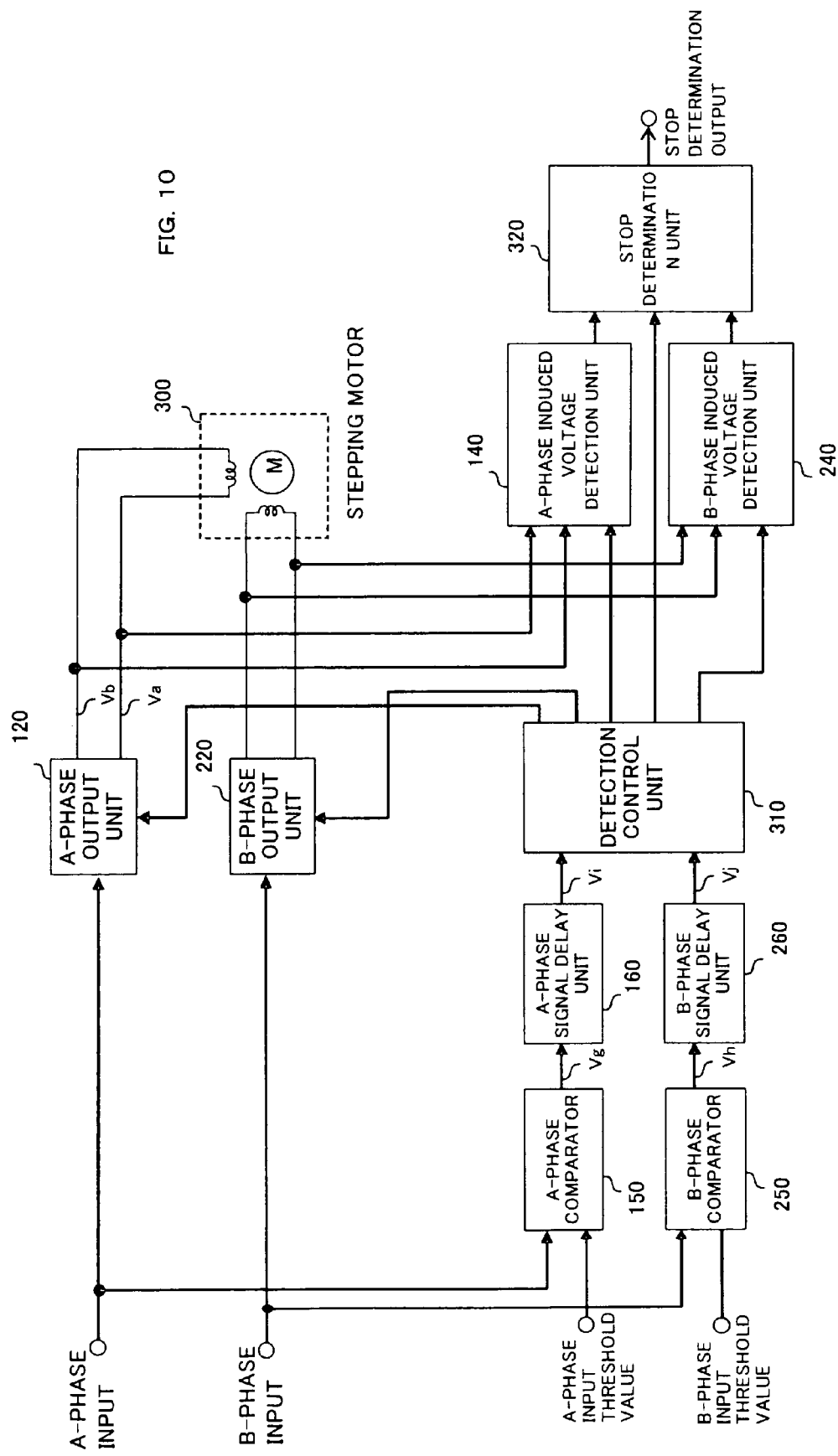
FIG. 10 is an explanatory drawing showing a fourth embodiment of the present invention.
Figure 11:
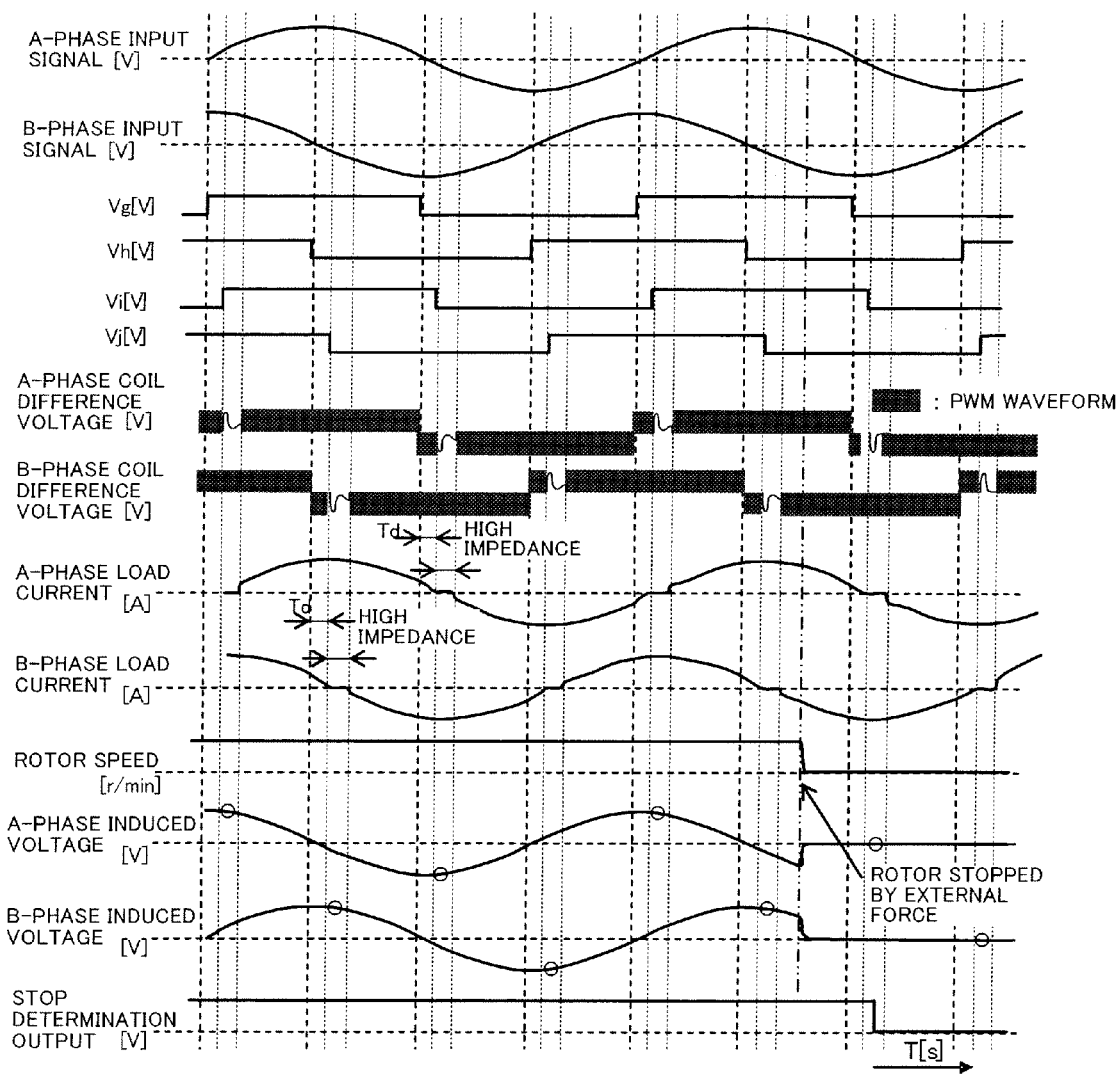
FIG. 11 is the input/output waveform chart of FIG. 10.
Figure 12:
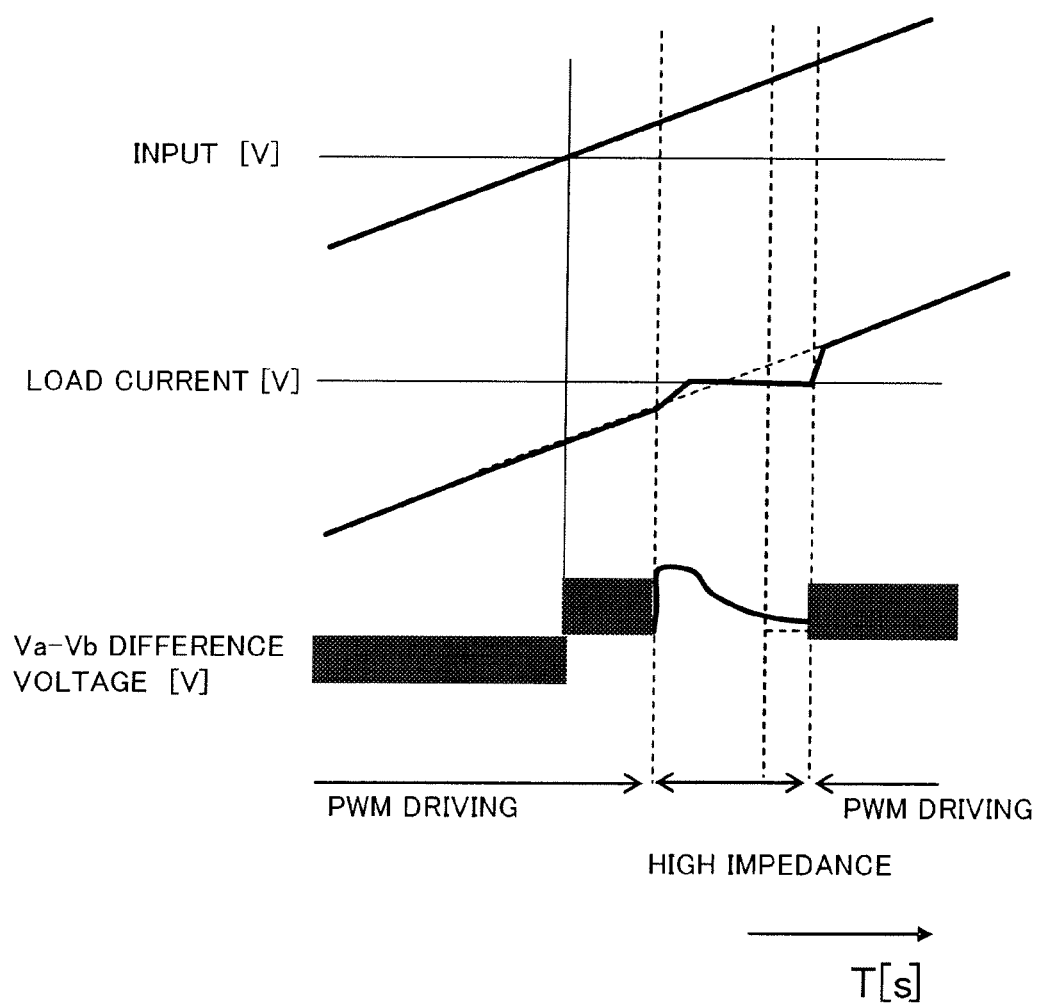
FIG. 12 is a waveform chart around the dead zone of FIG. 11.

FIG. 10 is an explanatory drawing showing the fourth embodiment of the present invention. In the embodiment of FIG. 10, the output signals (Vg, Vh) of an A-phase comparator and a B-phase comparator are respectively inputted to an A-phase signal delay unit (160) and a B-phase signal delay unit (260) which can delay the signals by a predetermined time, and delay results are inputted to a detection control unit (310). As illustrated in FIG. 9B, the phase of a current waveform is delayed by the inductance of a motor and a resistance component and the timing of the zero cross of output current is considerably delayed by the phase delay. In FIG. 10, by delaying the signals in the A-phase signal delay unit (160) and the B-phase signal delay unit (260), detection is performed at the zero cross of output current. FIG. 11 shows the signal timing of Vg, Vh, Vi and Vj and the relationship between an input/output and an induced voltage. FIG. 12 is an enlarged view around the zero cross of an input signal. By delaying the timing of switching to a high impedance by the delay of the zero cross of a load current, the timing of the zero cross of an input signal can be switched when the load current is zero. Thus a high-impedance time can be shortened, so that distortions can be suppressed and detection can be performed in a short time.

Figure 13:
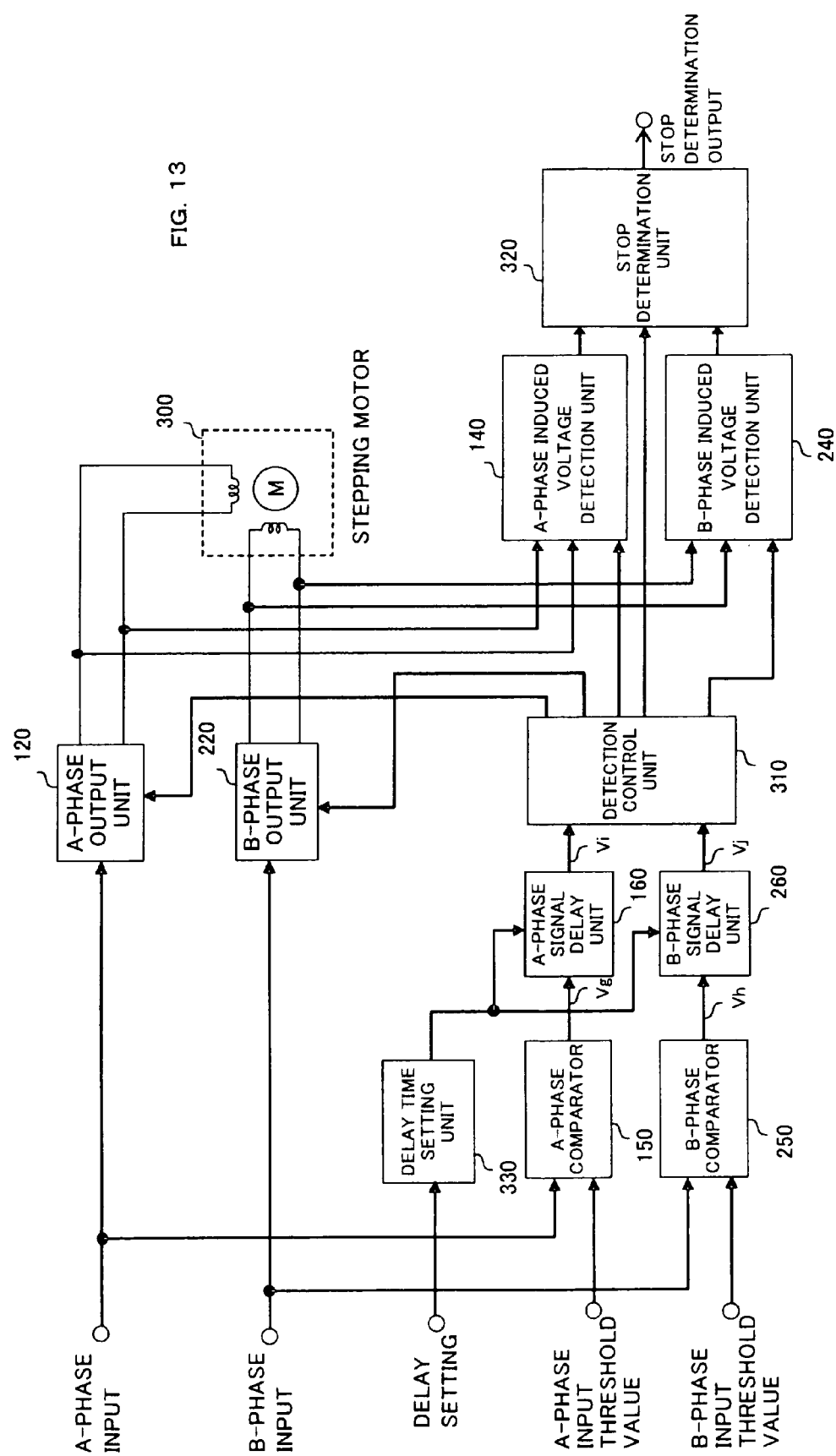
FIG. 13 is an explanatory drawing showing of the present invention.

FIG. 13 is an explanatory drawing showing the fifth embodiment of the present invention. The timing delay of an input zero cross can be adjusted in response to a signal from the inside or the outside of a circuit, so that it is possible to respond to fluctuations in delay time. The delay time changes with surrounding conditions such as a load of a coil and an input waveform.

Figure 14:
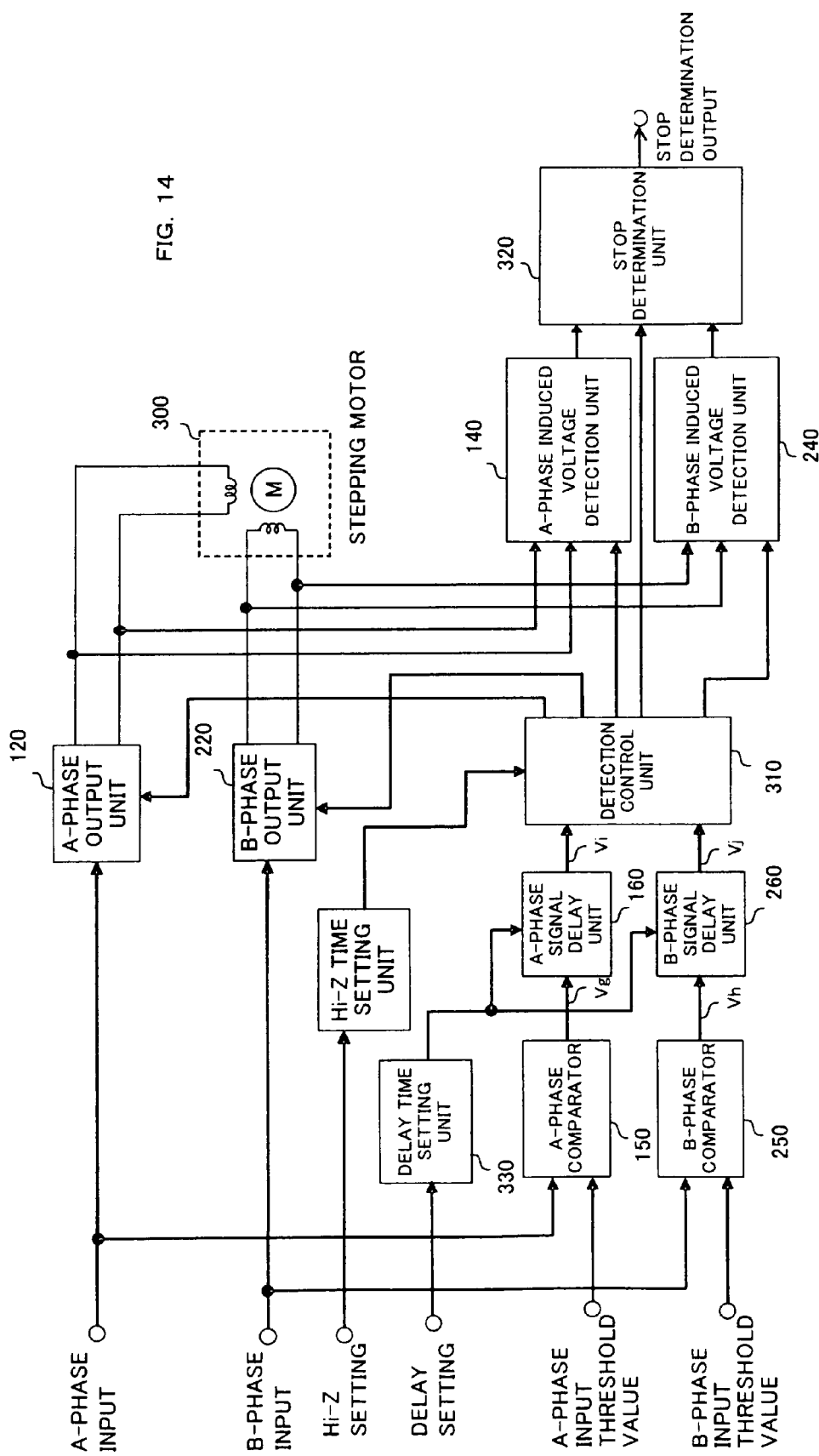
FIG. 14 is an explanatory drawing showing a sixth embodiment of the present invention.

FIG. 14 is an explanatory drawing showing the sixth embodiment of the present invention. Discharge by the regeneration of a load current is not always completely switched at zero current, and a discharge time of current is actually necessary. When the load of a coil is changed by changing stepping motors or when surrounding conditions are changed, the discharge time fluctuates. A state is optimized by changing a high-impedance time in response to a signal from the inside or outside of a circuit. This configuration can prevent erroneous detection which is caused by a residual coil current because of an insufficient high-impedance time as shown in FIG. 9B. When the high-impedance time is longer than necessary, a driving waveform with few distortions can be obtained by eliminating an excessive high-impedance time.

The present invention can reduce the possibility of noise, vibrations, and loss of synchronization, efficiently rotate a stepping motor, and determine whether a rotor is stopped or not. The present invention is particularly applicable to a driver of a stepping motor for determining whether an optical pickup is stopped or not in an optical disk device. Further, the present invention is applicable to a driver of a stepping motor as a resetting operation to the zero position of an analog instrument and the like.

What is claimed is:

1. A driver of a stepping motor, the driver comprising:
    an output unit for passing a load current to a driving coil of the stepping motor;
    a zero-cross detection unit for detecting a zero cross or near zero cross of the load current;
    an induced voltage detection unit for detecting an induced voltage of the driving coil when a zero cross or near zero cross of the load current is detected; and
    a determination unit for determining a state of a rotor of the stepping motor based on an induced voltage detected by the induced voltage detection unit,
    wherein the zero-cross detection unit includes a comparator for comparing an input signal to the output unit with an input threshold, and a signal delay unit for delaying a signal from the comparator, for detecting a zero cross or near zero cross of the load current by delaying the signal from the comparator through the signal delay unit.

2. The driver of the stepping motor according to claim 1, wherein the signal delay unit is for delaying the signal from the comparator by a time period corresponding to a phase difference between the input signal to the output unit and the load current.

3. The driver of the stepping motor according to claim 1, wherein a delay time period of the signal from the comparator can be set.

4. A driver of a stepping motor having driving coils of multiple phases ($N \geq 2$), the driver comprising:
    output units of multiple phases ($N \geq 2$), each comprising first and second output means connected to two ends of a driving coil of the stepping motor and capable of outputting one of a voltage and a current in proportion to an input signal, a diode connected to pass a current in a forward direction from the first and second output means to a first power supply, and a diode connected to pass a current in a forward direction from a second power supply to the first and second output means, wherein the first power supply is for maintaining a higher potential than the second power supply, the output unit is for switching a state of the first and second output means to a high impedance state in response to a high-impedance switching signal, and for regenerating a current of the driving coil by each of the diodes when the first and second output means have high impedances;
    circuits of 1 to N phases, each comprising a comparator for comparing an input signal with one of a threshold value inputted from outside of the driver and a threshold value set in the driver, and outputting an output result as an induced voltage detection timing signal, and an induced voltage detection unit connected to two ends of the driving coil of the stepping motor, for detecting an induced voltage in response to a detection start signal of the induced voltage, and outputting a detection result signal;
    a detection control unit for outputting the high-impedance switching signal to the output unit in response to the induced voltage detection timing signal, and outputting the detection start signal of the induced voltage to the induced voltage detection unit, and a determination timing signal to a stop determination unit after a certain delay; and
    the stop determination unit is for outputting a state of a rotor of the stepping motor, such as rotation, stop, and loss of synchronization every time the stop determination unit receives the latest detection result signals from the induced voltage detection units of 1 to N phases and the determination timing signal from the detection control unit, and maintaining an output until the stop determination unit receives a subsequent determination timing signal.

* * * * *